United States Patent [19]

Nelson et al.

[11] Patent Number: 4,674,762
[45] Date of Patent: Jun. 23, 1987

[54] FOUR-WHEEL, RECLINING POSITION CYCLE

[76] Inventors: Terrence L. Nelson, 1530 SW. 197th Ave., Aloha, Oreg. 97006; Thomas J. Kraker, 18990 SW. Blanton St., Aloha, Oreg. 97007

[21] Appl. No.: 699,155

[22] Filed: Feb. 7, 1985

[51] Int. Cl.$^4$ .......... B62K 23/06; B62M 1/06; B62M 9/04; B60G 11/20

[52] U.S. Cl. .................. 280/282; 267/57; 280/1.11 R; 280/88; 280/267; 280/269; 280/281 LP; 280/798; 305/27; 474/152; D12/88; D12/107; D21/78

[58] Field of Search ............ 280/282, 281 R, 281 LP, 280/267, 269, 700, 771, 774, 778, 779, 88, 91, 95 A, 781, 798, 1.11 R, 695; 180/205; 474/152; D12/88, 107; D21/78; 267/57, 154

[56] References Cited

U.S. PATENT DOCUMENTS

| | | | |
|---|---|---|---|
| D. 191,586 | 10/1961 | Byrn et al. ............ | D21/78 |
| 2,227,762 | 1/1941 | Ronning ............ | 280/6 H X |
| 2,659,596 | 11/1953 | Keysor ............ | 305/27 X |
| 3,386,778 | 6/1968 | Rymes ............ | 305/27 |
| 3,843,145 | 10/1974 | Templeton ............ | 280/282 X |
| 3,913,929 | 10/1975 | Matsuura ............ | 280/282 X |
| 4,094,532 | 6/1978 | Johnson et al. ............ | 267/57 X |
| 4,168,075 | 9/1979 | Matschinsky ............ | 280/6 H |
| 4,283,070 | 8/1981 | Forrestall et al. ............ | 280/281 LP X |
| 4,373,740 | 2/1983 | Hendrix ............ | 280/281 LP X |
| 4,432,561 | 2/1984 | Feikema et al. ............ | 280/267 X |
| 4,456,277 | 6/1984 | Carpenter ............ | 280/282 |

FOREIGN PATENT DOCUMENTS 890324  11/1943  France ............ 280/700

Primary Examiner—John J. Love
Assistant Examiner—Mitchell J. Hill
Attorney, Agent, or Firm—Glen A. Collett

[57] ABSTRACT

A four-wheel human powered vehicle including a frame for supporting the operator of the cycle in a substantially recumbent position, rear wheels mounted on the sides of the frame, two arms mounted on the frame and extending forwardly and outwardly therefrom, and each mounting a front wheel, steering means connected to the front wheels and controllable by the operator, and a crank boom extending forwardly from the frame and supporting a crank mounting foot pedals, and a drive attached thereto for transferring the power to one of the rear wheels.

10 Claims, 7 Drawing Figures

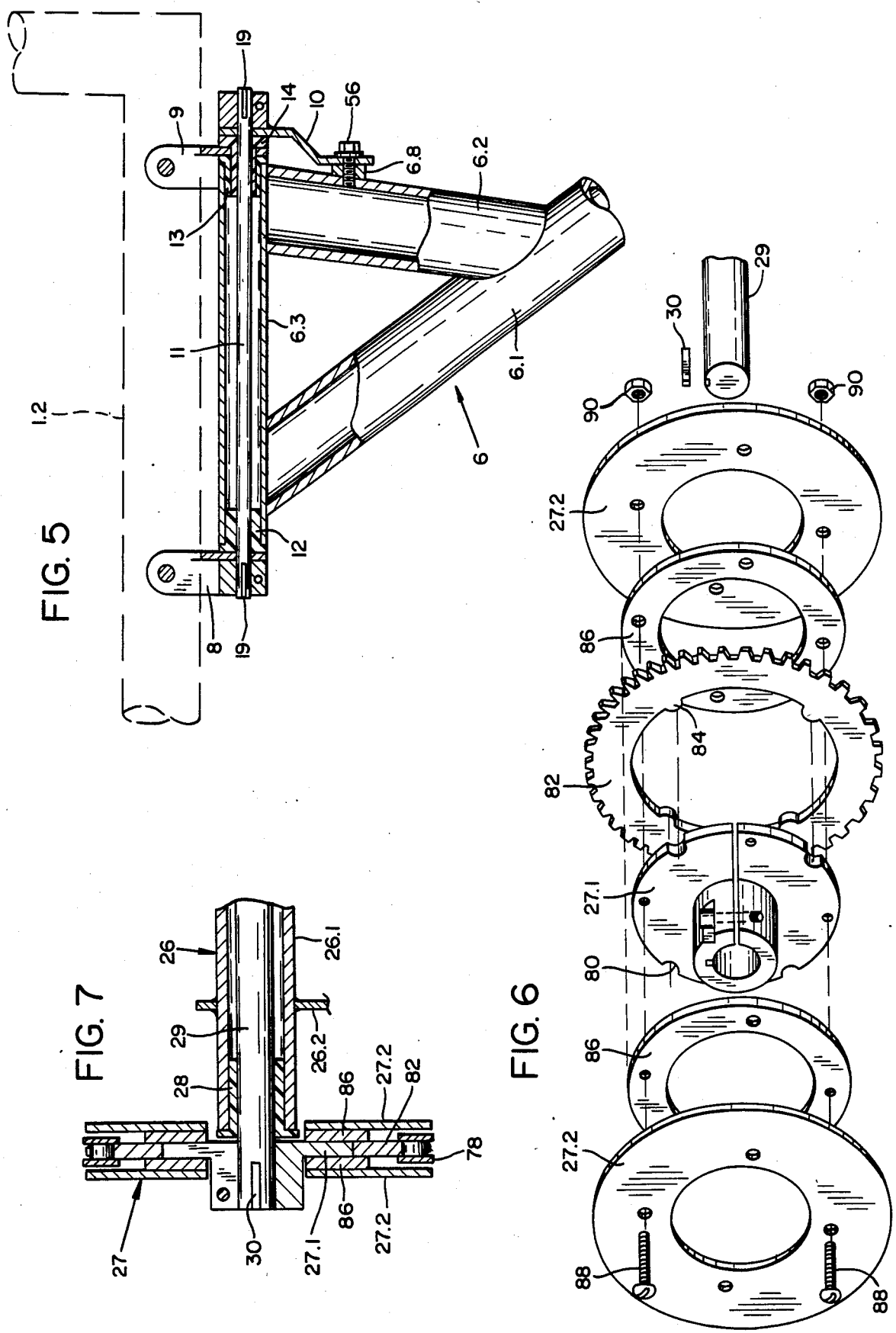

FOUR-WHEEL, RECLINING POSITION CYCLE

BACKGROUND OF THE INVENTION

This invention relates to cycles, and in particular to a four-wheel cycle having two forward steering wheels and two rearward wheels, one of which is driven.

For a thorough discussion of the prior art and previous developments in the cycle industry, the reader is referred to the background section of the patent to Carpenter, U.S. Pat. No. 4,456,277. It is not deemed necessary to reproduce that information here, but rather to discuss new developments relating to the present device.

There have been many three-wheel recumbent cycles invented in recent years, showing a growing trend to this type of vehicle. However, although four-wheel motorized vehicles are, of course, common, there has been little evidence of development work on four-wheel cycles. Tricycles have serious limitations as a recumbent vehicle, primarily because one of the wheels must be in line with the operator. This makes steering difficult and unresponsive because of the long wheelbase. It also elongates the vehicle, giving it a gangling appearance. Further, the frame must be heavier and stronger to support the weight of the operator between the long wheelbase.

It was desired to develop a vehicle which had the objects of being small yet comfortable, readily maneuverable, having various gears for power or speed, easily controlled, and safe. Further, it was desired to employ as many standard bicycle parts as possible, to reduce cost and facilitate repair. These and other objects and advantages, and the manner in which they are achieved will be made apparent in the following specification and claims.

SUMMARY OF THE INVENTION

In its basic concept, the present invention is a four-wheel, human powered vehicle including a frame for supporting the operator of the cycle in a substantially recumbent position, rear wheels mounted at the sides of the frame, two arms mounted on the frame and extending forwardly and outwardly therefrom, and each mounting a front wheel, steering means connected to the front wheels and controllable by the operator, and a crank boom extending forwardly from the frame and supporting a crank mounting foot pedals, and a drive attached thereto for transferring the power to one of the rear wheels. Also disclosed is an independently sprung suspension for the front wheels, and a sprocket assembly having a safety guard.

BRIEF DESCRIPTION OF THE DRAWINGS

FIG. 5 is a cut-away section of the swing arm suspension and torsion bar components of the present invention.

FIG. 6 is an assembly view of the sprocket carrier and guard of the present invention.

FIG. 7 is a section of the assembled sprocket carrier and a fragmentary portion of the jackshaft of the present invention.

DESCRIPTION OF THE PREFERRED EMBODIMENT

Figure 1:
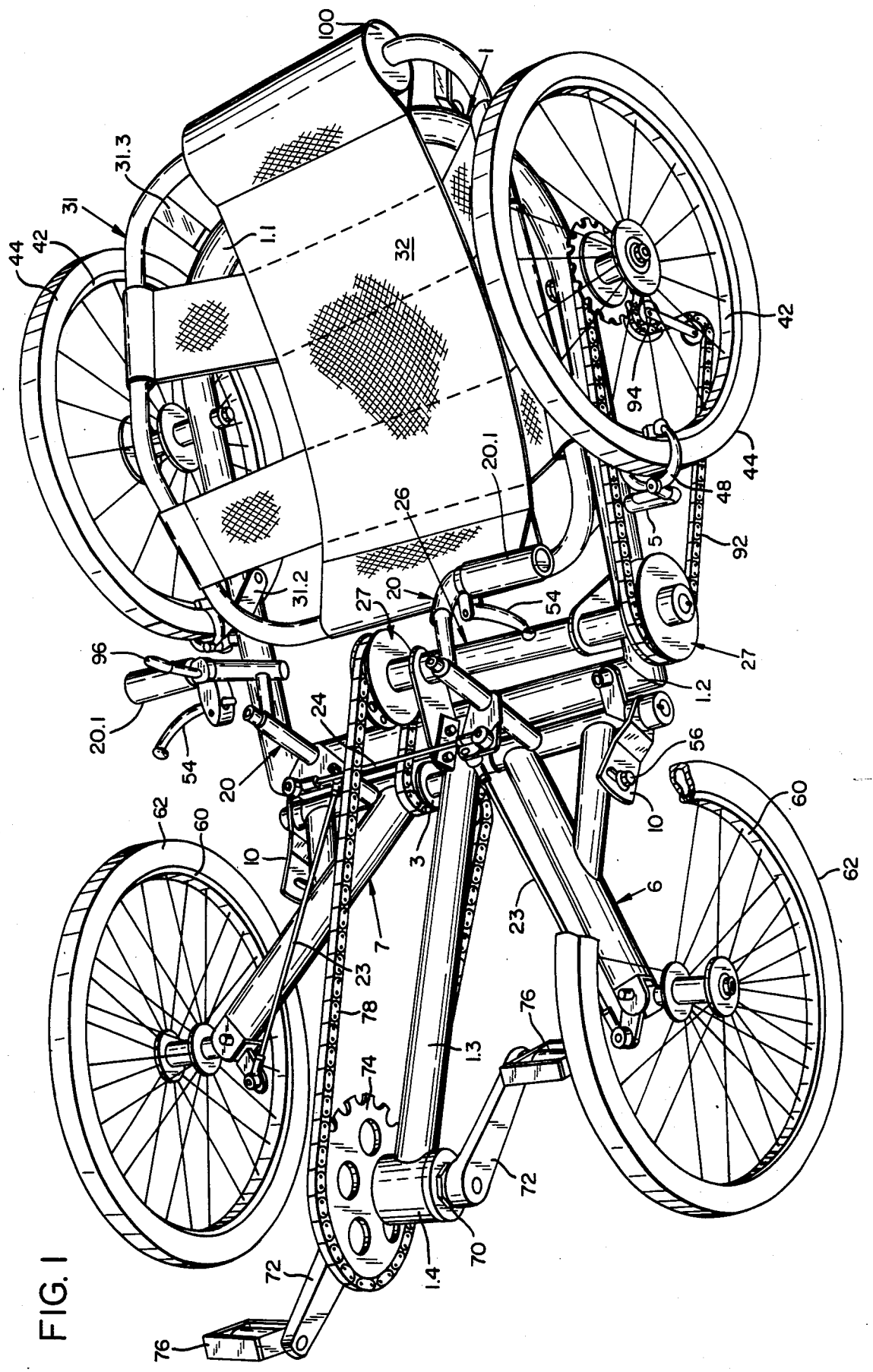
FIG. 1 is a top perspective view of the four-wheel, reclining position cycle of the present invention.
Figure 2:
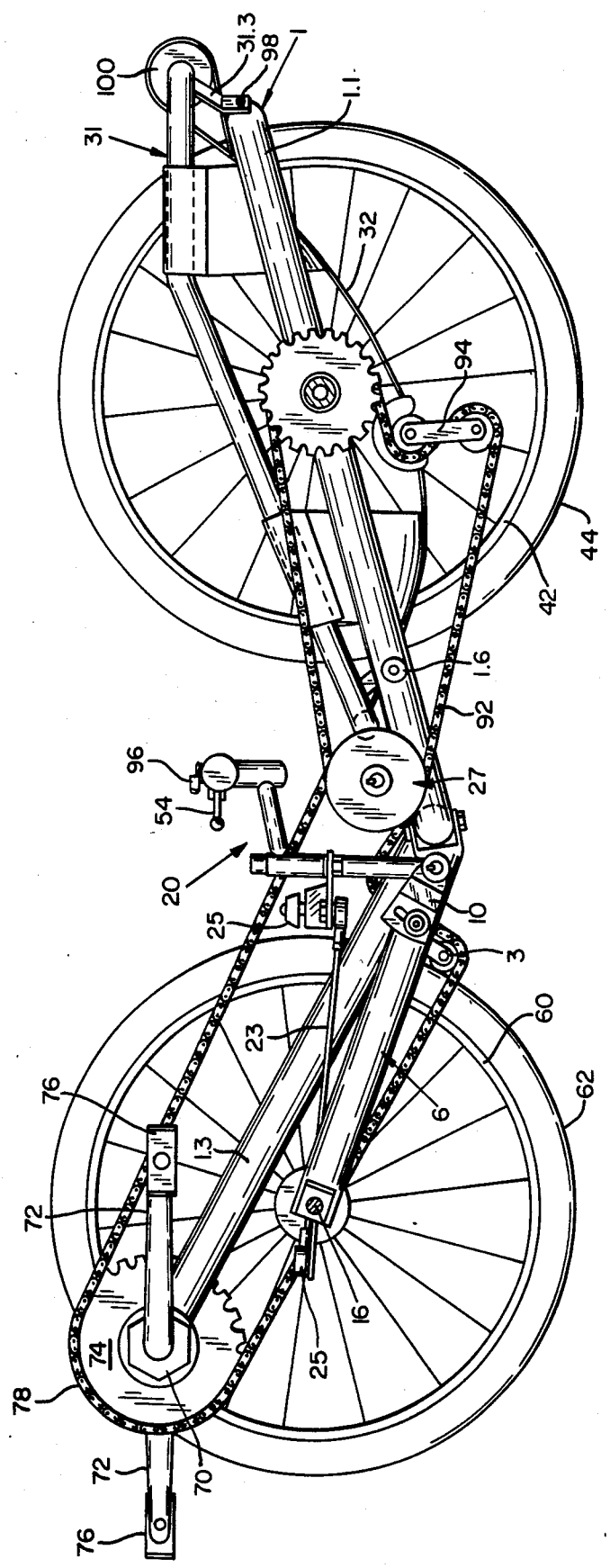
FIG. 2 is a side view of the cycle of FIG. 1, shown in section, as if the two closest wheels were removed.
Figure 3:
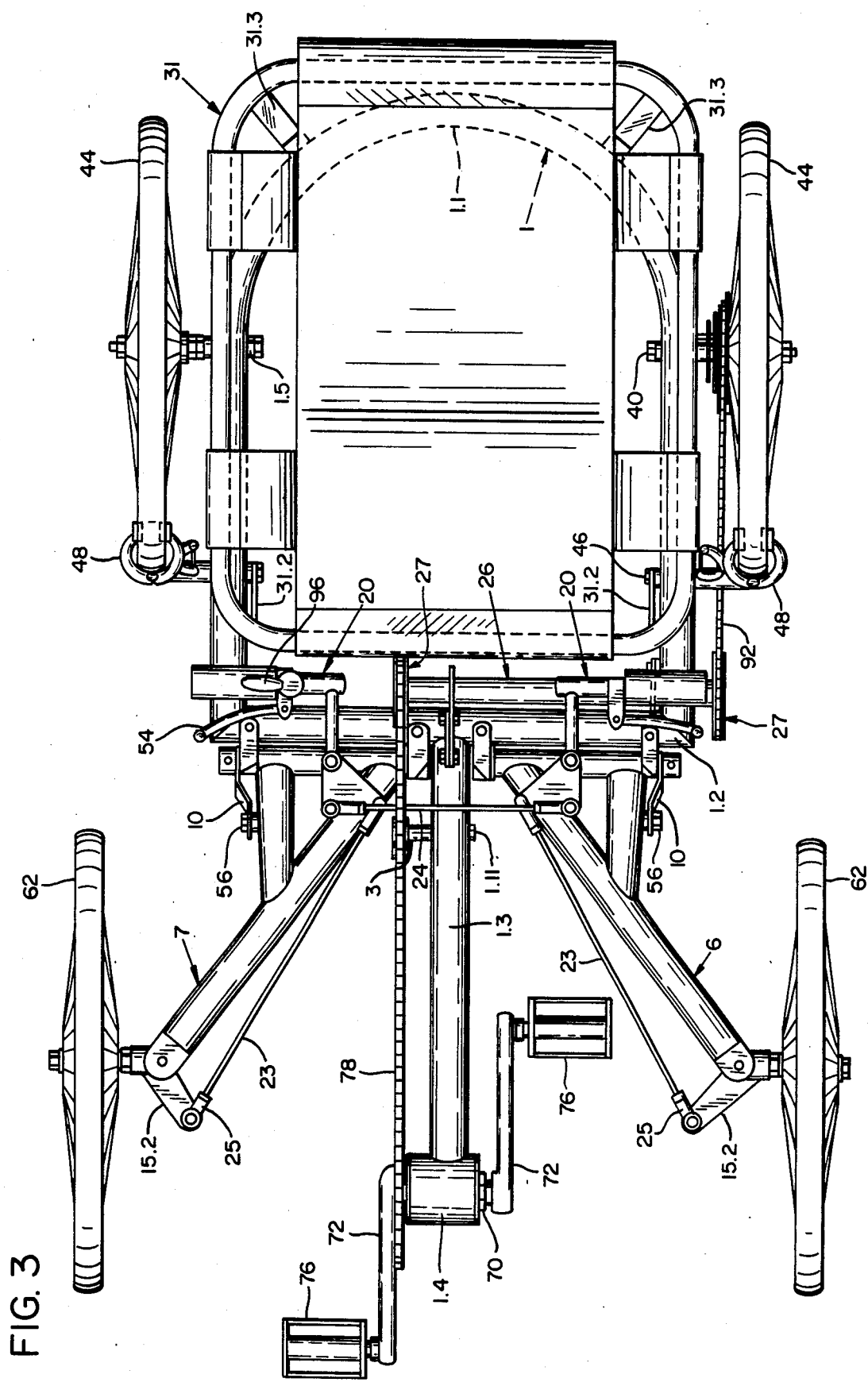
FIG. 3 is a top view of the cycle of FIG. 1.

As shown in the drawings, particularly FIG. 1, the present invention is a human powered vehicle using a design and components which structure is commonly referred to as a cycle. The present device is distinctive from a bicycle or tricycle in that it has four wheels. Of course motorized four wheel vehicles are common, but not so with human powered vehicles. The present device is intended for an adult rider or operator. Another distinctive feature is that the operator is in a supine or reclining position, commonly referred to as recumbent, and that his feet are higher than most of the rest of the mass of his body.

Figure 4:
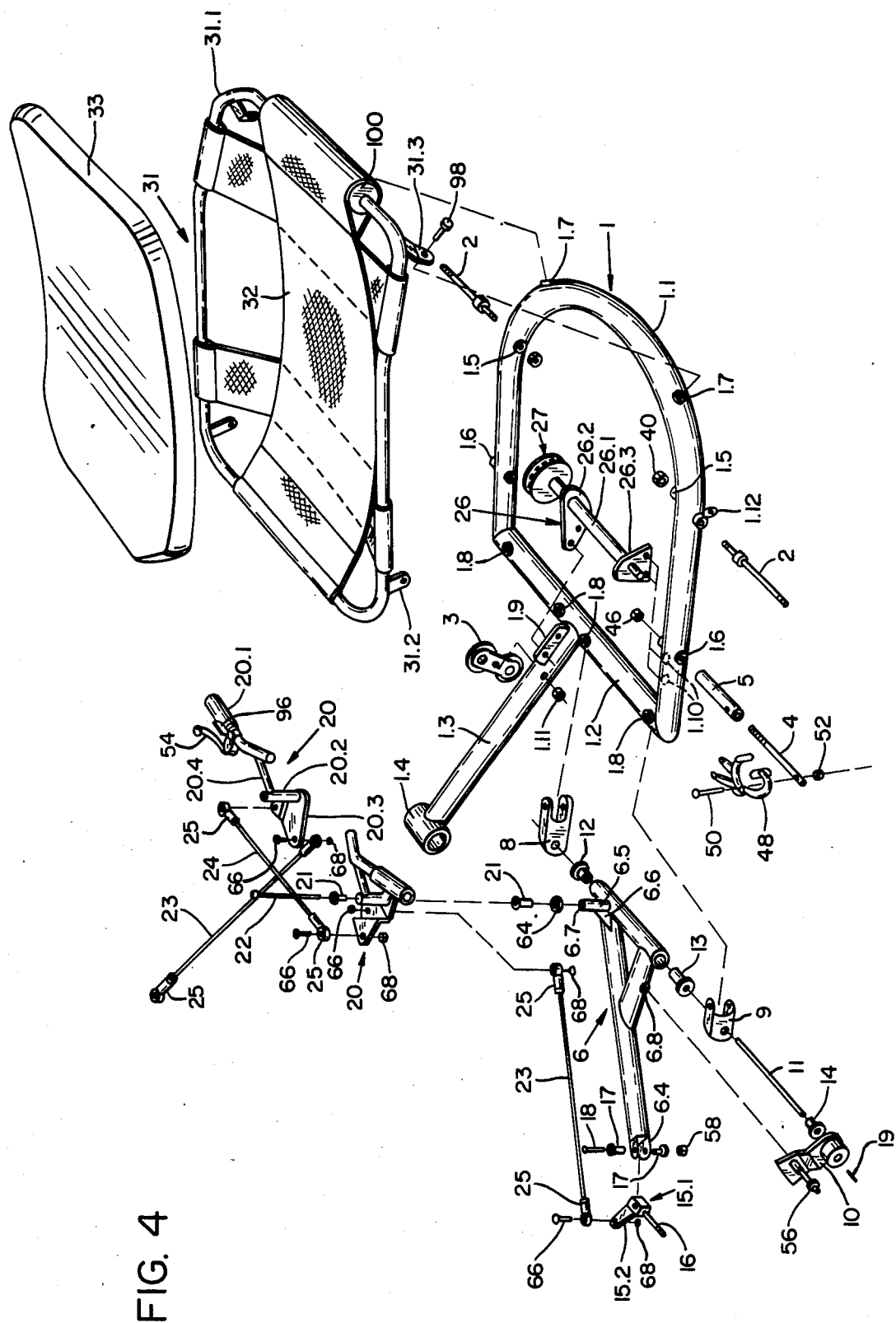
FIG. 4 is an exploded view of the assembly of pieces of the frame, seat, steering linkage, and representative parts of the swing arm suspension, brakes, and drive train, of the cycle of the present invention.

FIG. 4 illustrates the structure of the invention. A main frame, generally shown at 1, is of a D-shaped configuration in one plane, having a straight cross tube 1.2 positioned at a point substantially beneath the operator's knees, and a curved U-shaped tube 1.1 curved arcuately, rearwardly of the cross tube. The frame provides seat supporting means for supporting the operator of the cycle in a substantially recumbent position.

The frame also includes a crank boom 1.3 which extends forwardly from the center of cross tube 1.2 of D-shaped frame 1, and supports a bottom bracket mount 1.4.

The frame further includes rear spindle mount 1.5, rear brake mount 1.6, seat mounting nuts 1.7, swing arm yoke mounting nuts 1.8, jackshaft mounting tang 1.9, jackshaft mounting nut 1.10, chain tensioner mounting nut 1.11, and derailleur mounting tang 1.12. Each of these serve to fasten parts of the cycle to the main frame.

Rear spindles 2, and their associated nuts 40, each mount one of rear wheels 42, having tires 44.

Brake mount rod 4, and its associated nut 46 and brake mount sleeve 5 attach to the rear brake mount 1.6 and support a caliper brake 48 by bolt 50 and nut 52. An independent caliper brake is provided for each of the rear wheels, controlled by independent handgrips 54 adjacent the steering means.

The front suspension includes similar but independent swing arms 6 and 7, left and right, which each include an arm tube 6.1, a brace tube 6.2, and a pivot tube 6.3 attached together in a triangular pattern. The arms are mounted or jointed on the frame, each extending forwardly and outwardly therefrom one on each side of center. The arms further comprise a camber block mounting yoke 6.4, a control bar mount extension 6.5, a control bar mount gusset 6.6, a control bar mount nut 6.7, and a preload lever mounting nut 6.8.

Spring anchor yoke 8 bolts to swing arm yoke mounting nut 1.8, as similarly does spring pivot yoke 9, jointing the arm to the frame at the spaced-apart ends of the pivot tube. Inside pivot tube 6.3, a torsion spring 11 extends between the spring anchor yoke and the spring pivot yoke. The torsion spring extends through pivot bushings 12,13 and 14. It is keyed at its inner end to the spring anchor yoke, and at its outer end to a spring preload adjustment lever 10 by torsion spring keys 19. The preload adjustment lever is mounted adjustably by a bolt 56 to preload lever mounting nut 6.8. Accordingly, one end of the spring is attached to the frame, while the other end is attached to the swing arm. Thus the swing arm is mounted pivotally, while the spring provides stiff resiliency to the joint to support the frame off the ground when the cycle is fully loaded, but to resiliently flex to absorb shock as the front wheel encounters a bump.

Attached to the camber block mounting yoke 6.4 is a camber block 15.1 which has a steering nuckle 15.2. It is pivoted on king pin bushings 17 by king pin 18, secured by nut 58. A front spindle 16 extends from the camber block and mounts front wheel 60 having a front tire 62. Thus, each front wheel is mounted pivotally to its associated swing arm. The particular angle of the camber yoke is set to give the proper steering geometry. The overall cambering effect is similar to that of an automobile, and for similar purposes.

The control bars, or handles, providing a steering means, mount on top of the control bar mount extension 6.5. The control bars, denoted generally at 20, include a handle tube 20.1, a pivot sleeve 20.2, a bellcrank 20.3 and a set back extension 20.4. Control bar pivot bushings 21 mount in the pivot sleeve and control bar pivot shaft 22 extends therethrough. A jam nut 64 is threaded on the control bar pivot shaft and locks against the control bar mount nut 6.7 into which the shaft is threaded. The control bar is allowed to freely pivot.

Relay rods 23 extend between the bellcrank 20.3 and the steering nuckle 15.2 of the camber block of each associated arm. A cross-link rod 24 extends between the right and left bellcranks. Accordingly, the steering of the cycle is coordinated because the pivoting actions of the front wheels are linked. On each end of each rod is provided a rod end 25, which is threaded onto the rod for adjustability to modify the length between the linkage ends, so that the steering may be properly set. The rod ends are attached to their respective locations by steering bolts and nuts 66 and 68, respectively.

The bottom bracket mount 1.4 mounts a bottom bracket 70, which includes the bearings and crankshaft of the crank assembly. Cranks 72 are mounted on the bottom bracket as is drive sprocket 74. Pedals 76, for operation by the rider's feet are mounted on the cranks. This assembly is all common bicycle parts.

A chain 78 is driven by sprocket 74 and extends to a sprocket mounted on a jackshaft 29. FIGS. 6 and 7 illustrate the sprocket carrier of the jackshaft more completely. The jackshaft carrier, shown generally at 26, includes a carrier tube 26.1 which is mounted by an inner carrier bracket 26.2 bolted to the jackshaft mounting tang 1.9, and an outer carrier bracket 26.3 bolted to jackshaft mounting nut 1.10. A sprocket carrier, shown generally at 27, includes a sprocket hub 27.1, including means for mounting the hub on a shaft, and a plate having engagement means such as interlocks 80 for engaging a sprocket ring, shown at 82, and having mating interlocks 84. A clamp ring 86 is mounted on each side of the sprocket ring and hub plate and is dimensioned to overlap the junction thereof. A guard ring 27.2 is mounted on each side, exterior of the clamp ring. It is of such a dimension that it extends directly further than the teeth of the sprocket. The two guard rings are spaced apart by the clamp rings, hub plate and sprocket rings such a distance that the chain engaging the sprocket will fit between the guard rings. Fastening means such as bolts 88 and nuts 90 secure the assembly together. The sprocket carriers are mounted on the jackshaft by a hub key 30. The assembly is mounted in the carrier tube through flange bearings 28.

A chain tensioner 3 is mounted on the crank boom and engages chain 78. The spring action of the chain tensioner keeps the chain tight, and compensates for irregularities in chain length.

On the other end of jackshaft 29 is mounted a second sprocket carrier, of similar construction. The sprockets placed on the sprocket carriers may be of different diameters, and may be interchanged with common bicycle parts as desired. The guard rings are of a size that they are larger in diameter than the largest sprocket ring intended to be used. Any of the several sprockets may have other different sized sprockets alongside the first, for changing gear ratios as desired.

On the outer end of the jackshaft assembly is mounted a second chain 92, which extends to a derailleur 94 mounted on derailleur mounting tang 1.12. A set of sprockets mounted on the driven wheel allow the gears to be changed as desired by the operator. A gear shift control 96 is mounted on one of the control bar handles.

It is possible to extend the jackshaft the full width of the vehicle and drive both wheels. However, it is found that driving one wheel is sufficient, and there is no notable lack of traction or control.

A seat frame is mounted above the main frame and includes a seat frame tube 31.1, front mounting brackets 31.2 and rear mounting brackets 31.3. The seat frame is fastened to the main frame at seat mounting nuts 1.7 by bolts 98. A seat sling 32 is formed within the tubular frame and overlaps the frame in the front and back and on both sides. Around the rear tube of the seat frame is a padded roll 100 overlapped by the seat sling, and is for supporting the back of the operator. A seat pad 33 is laid within the seat sling, and may be fastened by means of a burr and loop type fastener or the like. Thus, the operator is supported directly between the rear wheels, while the front wheels are mounted directly outside of the operator's legs.

There may be provided accessory attachments (not shown) and mounting means therefor as desired by the operator. Such items include,for example, a rearview mirror, and an upstanding flag for visibility. Such is highly reccomended, especially for riding on the road.

It will be appreciated that the present invention provides a unique, compact and exceptionally agile vehicle. The ease and fun of riding far surpasses that of comparable cycles previously developed.

Obvious modifications may be made to the invention without departing from the spirit and scope thereof. The description is directed to the preferred embodiment only, and no limitation is intended thereby.

Having described our invention in its preferred embodiment, we claim:

1. A four wheeled, human-powered cycle, comprising:
    (a) a frame including a seat supporting means for supporting the operator of the cycle in a substantially recumbent position;
    (b) two rear wheels, one mounted on each side of the frame, with the operator supported directly therebetween; forwardly and outwardly therefrom, and each pivotally
    (c) two independent arms mounted on the frame and extending forwardly therefrom, one to each side of center, and each mounting a front spindle which extends pivotally from the end of the arm, and two front wheels, one mounted on each spindle, the front wheels being mounted directly outside of the operator's legs;

(d) steering menas connected to both front spindles and controllable by the operator for coordinated pivoting thereof to steer the cycle; and (e) a crank boom extending forwardly from the frame, between the front wheels, and supporting a crank mounting foot pedals, and means attached thereto for transferring power to drive one rear wheel.

2. The cycle of claim 1, wherein the frame comprises a D-shaped member in one plane, configured and dimensioned to support the weight of a person in a recumbent position with the straight cross tube of the frame being positioned at a point substantially beneath the operator's knees, and the curved portion of the frame being a tube curved arcuately, rearwardly of the cross tube, the cross tube supporting the arms and the crank boom.

3. The cycle of claim 1, wherein the arms are pivoted substantially horizontally to the frame, at a joint adjacent the frame, each being independently supported by a spring means for providing stiff resiliency to the joint, the spring being of such a tension to support the frame off the ground when the cycle is fully loaded, but to resiliently flex as the front wheel encounters a bump.

4. The cycle of claim 3 wherein the spring means comprises a torsion spring, mounted coaxially with the joint.

5. The cycle of claim 1 wherein the steering means comprises a handle mounted on each arm adjacent the frame, a linkage connected from the handle to the spindle mounting the front wheel of the associated arm, and a linkage connecting the handles directly together to coordinate the movement of the handles and the front wheels.

6. The cycle of claim 5 wherein the steering linkages include adjustment means for modifying the length between the linkage ends for adjusting or correcting the steering geometry of the cycle.

7. The cycle of claim 1 wherein the crank boom extends centrally from the frame forwardly and upwardly to a point higher than the center of mass of the operator.

8. The cycle of claim 1 wherein the crank drives a sprocket, which in turn drives a chain, and further comprising a jackshaft mounted on the frame substantially adjacent the mounting of the arms to the frame and extending from substantially the center of the cycle to one side thereof, and having a sprocket means on each end thereof, to the sprocket at the centrally located end of which is attached the chain from the crank sprocket, and to the sprocket at the outside end of which is mounted a second chain connected to and driving a sprocket on the associated, and only one, rear wheel.

9. The cycle of claim 1 further comprising a seat frame mounted on and above the main frame and having attached thereto a flexible seat sling, overlaid by a flexible pad for supporting the operator, and further comprising a padded roll about the back of the seat frame and overlaid by the sling for supporting the back of the operator.

10. The cycle of claim 1 further comprising independent brakes engagable with each rear wheel, and handgrip means adjacent the steering means for independently operating the brakes.

* * * * *